Patented Sept. 11, 1951

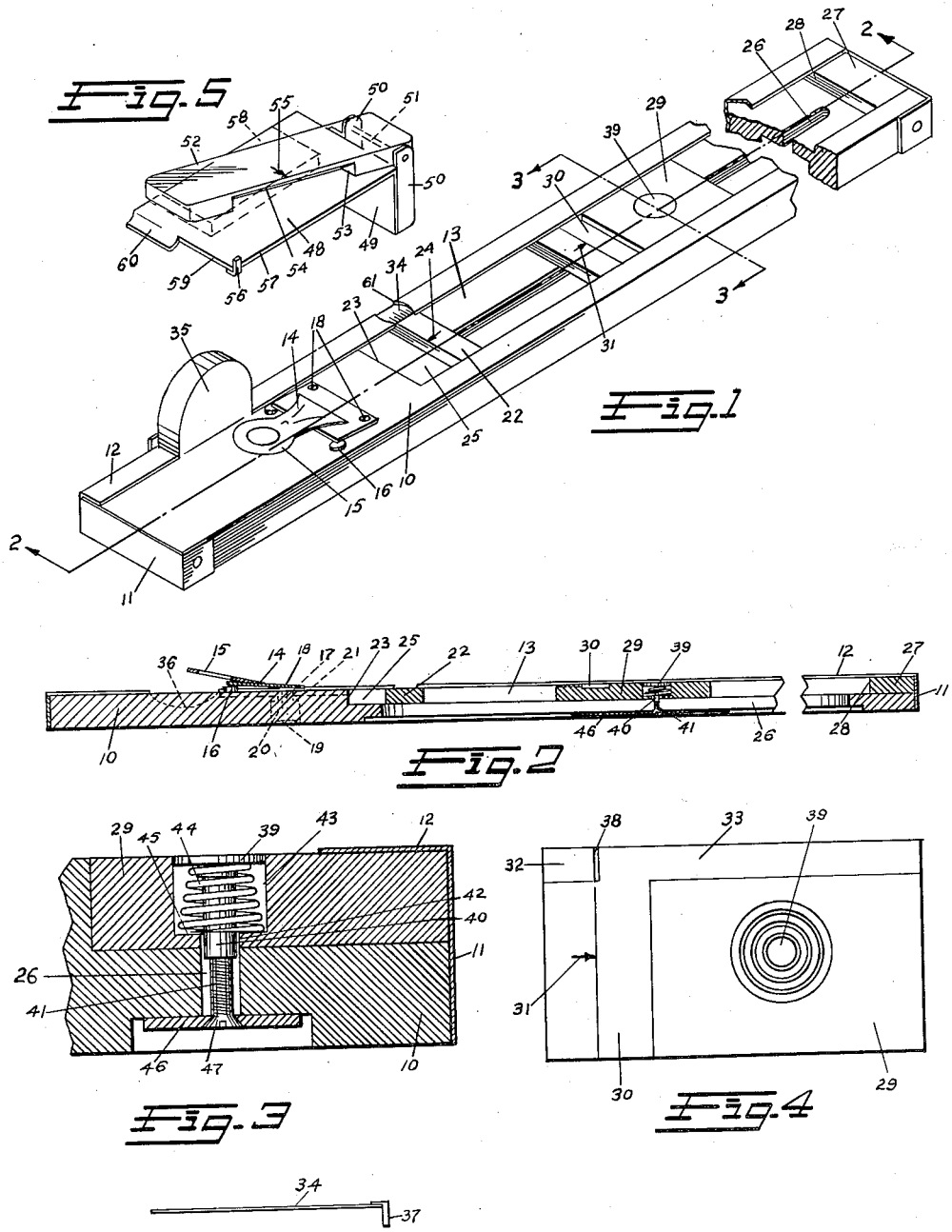

2,567,262

UNITED STATES PATENT OFFICE 2,567,262

MARK-POSITIONING DEVICE

Frank F. Willms, East Rockaway, N. Y.

Application August 11, 1945, Serial No. 610,386

4 Claims. (Cl. 33—127)

(Granted under the act of March 3, 1883, as amended April 30, 1928; 370 O. G. 757)

This invention relates to a mark-positioning device and more particularly to a portable device for positioning markings on test samples cut in the form of tape or a wire strand.

It is the practice of testing laboratories to use a bench mark adjacent which a test sample piece of material is held taut so that a given length of material can be marked off. The markings upon the wire or tape are usually made with crayon or with an inking fluid. The marked off length of material is then subjected to an elongation test, the amount of elongation being determined by comparing the distance between markings after elongation with the distance between markings prior to elongation.

Hitherto, when crayon has been used, the crayon marking has often peeled and fallen away from the surface of the wire or tape during elongation, so that it became practically impossible to make an accurate measure of the elongation of the material. This required a new sample to be marked and tested, resulting in a waste of time and materials. To avoid this peeling of the crayon, the more durable inking fluid has been used, but this inking fluid has often overrun and spread unevenly over the wire or tape, making a smudged marking not only on the material to be subjected to elongation but also upon the bench mark. The smudged material then had to be wiped and remarked, the bench marker had to be wiped dry, and another attempt to obtain a clean marking had to be made. If the material to be tested absorbed the inking fluid, a new sample had to be marked. Moreover, the bench mark, in time, often became sufficiently ink-stained to impair its use as a scale. Moreover, as the bench marks are usually not portable, an obvious disadvantage arose when the material to be measured came in large bulky reels, which might be temporarily located far from the bench mark.

It is an object of this invention to provide a mark-positioning device which will enable one to make clean and sharp ink markings upon material cut in the form of tape or wire.

Another object is to provide a mark-positioning device wherein the scale is protected from inking fluid stains.

Another object is to provide a mark-positioning device which may be operated by one person.

A further object is to provide a portable mark-positioning device having the above described advantages.

Further objects and advantages of this invention, as well as its construction, arrangement and operation, will be apparent from the following description and claims in connection with the accompanying drawings, in which Fig. 1 is an isometric view of one embodiment of this invention, Fig. 2 is a cross-section taken along the line 2—2 of Fig. 1 omitting the housing for the scale.

Fig. 3 is a cross-section taken along the line 3—3 of Fig. 1,

Fig. 4 is a plan view of the slider which forms a part of this invention,

Fig. 5 is an isometric view of an attachment used with this invention,

Fig. 6 is a side view of the end of the scale that is a part of a conventional steel tape.

Figure 7:
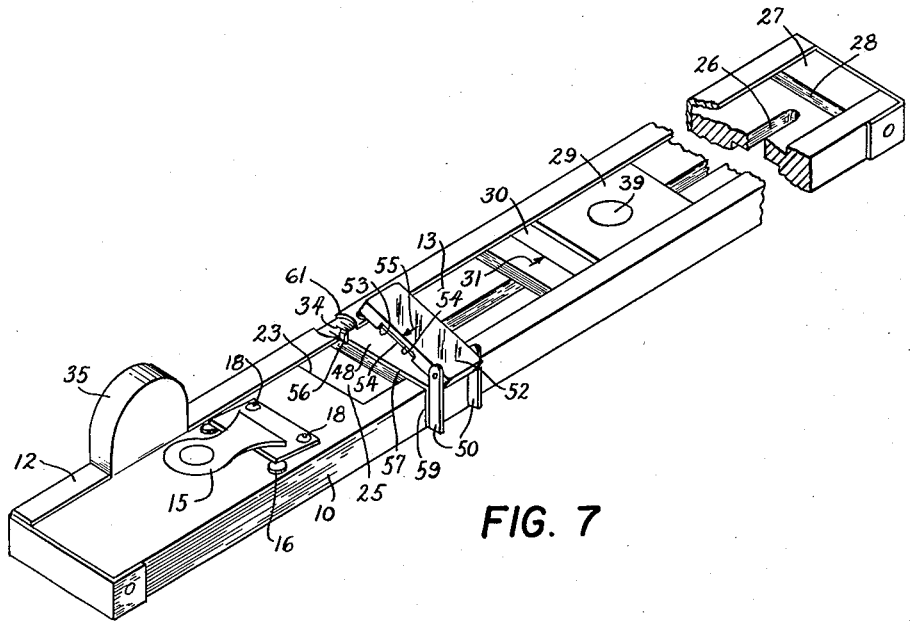
Fig. 7 is a view similar to Fig. 1 showing the attachment of Fig. 5 mounted in place on the mark-positioning device.
Figure 8:
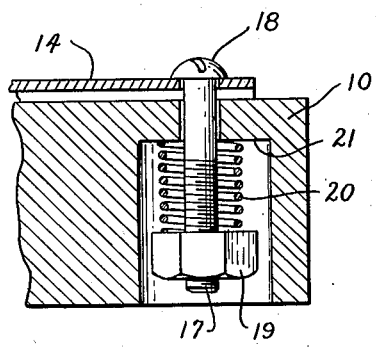
Fig. 8 is a sectional view showing the mounting of plate 14 on screws 18.

Fig. 1 shows a base 10 having a reenforcing member 11 girdling three sides and a portion of the front side of said base 10. A top portion 12 of said reenforcing member 11 is bent down to rest upon the rear top face of the base 10. A hollowed out segment or recess 13 is cut out of the major portion of the base 10, said recess 13 extending partially downward through the thickness of the base 10.

Near the left end on the top face of the base 10 is any suitable clamping or gripping means; the particular one used in this embodiment of the invention consisting of a plate 14, an offset and elevated arm or lever 15 attached to said plate, and semi-circular rocker members 16 secured to the rear edge of the plate 14 to serve as the fulcrum about which the plate 14 turns when the lever arm 15 is pressed downward.

Screws 17 (Fig. 2) pass through the front corners of the plate 14, the enlarged heads 18 of said screws 17 preventing the complete passage of screws 17 through the plate 14.

Fig. 2 shows how a nut 19 threadingly engages the screw 17. A strong expansion spring 20 is positioned between the nut 19 and the shoulder 21 cut into the base 10. The tension in the spring 19 constantly urges the plate 14 towards the base 10. There are two such springs 20, both imbedded in the base 10 beneath the screw heads 18 in the manner shown in Fig. 2.

A reenforced horizontal crosspiece 22 having a top face flush with the uncut top face of base 10 is fixedly secured in the recess 13 a short distance in front of the vertical wall 23 and an indicating mark 24 is etched or cut into the approximate center of said crosspiece 22. Thus a channel or groove 25, which is an extension of the channel 13, is permanently located between the raised edge 23 and the crosspiece 22. Since this channel 25 serves as a reservoir for catching surplus ink or staining fluid, it can be made as short as desirable to avoid adding unnecessary length to the entire marking device.

A slot 26 is cut into the base 10 substantially along the entire length of the recess 13 and between the crosspiece 22 and another horizontal crosspiece element 27 secured to the base 10 at the right end of the marking device. The vertical wall 28 of the horizontal element 27 restricts any further motion of the sliding frame 29 away from the horizontal crosspiece 22.

The sliding frame 29 is secured to the opposite inner walls of the recess 13 and is accurately positioned flush with said inner walls so that said sliding frame 29 can be made to slide along said inner walls. A channel 30 is cut in the forward portion of the sliding frame 29, said channel 30 being similar in function to channel 25, namely, to catch the surplus inking fluid that may fall from a brush marking off lengths on samples of wire or tape. An indicating mark 31, such as an arrow, is etched or cut into the forward part of the sliding member 29, said indicating mark 31 lying in the same line and plane as the indicating mark 24. The slider 29 has cut-out segments 32 and 33 (Fig. 4) which lie underneath the bent over reenforced top portion 12.

The cutout segment 32 is deepened sufficiently not only to fit under the reenforced top portion 12 but also to receive the end of a conventional self-winding steel ribbon scale 34 which is countersunk in the base 10, the hollow housing 35 being suitably secured to the base 10, said housing 35 serving as a protection for the conventional self-winding steel ribbon scale which rests in the arcuate cut-out seat 36 shown in Fig. 2.

At the tip of the steel scale 34 is an overhanging lip 37 (Fig. 6) which fits in the slit 38 (Fig. 4) in the sliding frame 29, so that the sliding of the frame 29 to and from the crosspiece 22 winds and unwinds the steel scale 34.

The frame 29 is made to move smoothly to and from the crosspiece 22 by maintaining pressure on a frictionally operated stop-button 39 with a grooved head, the construction of which is shown in Fig. 3. The shaft 40 of the stop-button 39 engages the threaded stem 41 of a screw, said stem 41 passing through the slot 26 and a bore 42 in the sliding member 29, said bore 42 opening into a countersunk portion 43. An expansion spring 44 is positioned between the shoulder 45 and the bottom portion of the head of the stop-button 39. A rectangular plate 46 supported by the screw head 47 is urged against the underside of the base 10 by the action of the spring 44. Pressure upon the grooved head of the stop-button 39, the grooves of which are to prevent an operator's finger from slipping during the application of pressure upon the stop-button 39, releases the plate 46 from the frictional engagement with the underside of the base 10 so that motion of the sliding frame 29 will be smooth.

Fig. 5 shows an attachment that is used with the marking device when the material to be marked is cut in the form of a thin strip of tape. It consists of a plate 48 bent at one end to form a wall 49 at right angles to said plate 48. Parallel offset and vertically disposed members 50 are secured to the back face of said wall 49, a horizontal rod 51 connects the top ends of said pair of parallel members 50, and a transparent block 52 of suitable material is rotatably secured to said rod 51 for rotatable motion about it.

The base of the transparent block 52 rests on the top surface of plate 48 except for that cut-out portion 53 of the base of the block 52 which allows the tape to be marked to pass between the top face of the plate 48 and the bottom face of the transparent block 52. Moreover, a bevelled edge 54 is cut into one edge of the block 52. The function of this bevelled edge 52 is to draw away, by adhesion, the surplus inking fluid that may drip from the pen or brush that is used to make a mark on a strip of tape. Since the plate 48 covers the crosspiece 22, as hereinafter described an indicating line or arrow 55 is cut into or drawn on the top face of the block 52.

A guide pin 56 protrudes from the left front corner of the plate 48 and serves to aid in the proper alignment of the block 52 with the forward edge 57 of the plate 48. A lug 58 depends from the underside of plate 48.

When the attachment is to be used with this marking device, it is fitted to the device by seating the lug 58 into the recess 13, said lug 58 having its length equal to the width of the recess 13, and urging the inner wall 49 against the front face of the base 10. The corner formed by the junction of the top face and side of the base 10 coacts with the corner formed by the junction of the wall 49 with the horizontal plate 48. The distance between the front wall of the depending lug 58 and the front edge 57 is exactly equal to the width of the crosspiece 22, and the left edge 59 is also as wide as or wider than the crosspiece 22, so that the ledge 60 of the attachment rides on the reenforcing top portion 12, permitting the scale 34 to be visible through the opening in the reenforced top portion 12. The opening is cut so that the opposing edges are shaped as half moons, and the two points 61 of the right half moon (Fig. 1) serve as an indicator setting. Said points 61 point off on the scale 34 the distance that the tip of the arrow 24 is from the tip of the arrow 31.

A similar but symmetrical attachment (not shown) is adapted to lie adjacent to and on top of the forward portion of the sliding frame 29.

In operation, the wire to be tested is secured to the gripping means near the left top face of the base 10 and is stretched taut by hand and kept parallel to the edge of the scale 34 by using the arrowheads 24 and 31 as a guide for said wire.

Pressure is applied and maintained on the stop-button 39 until the scale 34 reads the distance that separates the two arrowheads 24 and 31, said distance corresponding to the length of wire that is to be marked off. Pressure is released from the stop-button 39, locking the slider 29, and a brush, pen or similar marking implement marks off the desired length upon the wire. An aniline dye is preferred as an inking fluid as it will not peel from the surface of the wire when said wire is elongated. However, the inking fluid used is not a part of this invention, so any suitable fluid may be used.

The above described device enables one to make accurate markings upon the surface of a substance without the danger of smudging the surface or the scale that marks off the length of said material. Furthermore, the device is simple to operate, is portable, and capable of construction in various sizes.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A mark-positioning device comprising a base, a movable frame mounted on said base, a marking guide on said base, a marking guide on said movable frame, an index fixedly located on said base, a movable scale fixed at one end to said movable frame and adapted for registration with said index to indicate the linear distance between said marking guides, and a housing for enclosing said scale except for a limited portion exposed to view adjacent said index.

2. A mark-positioning device comprising a base member having a longitudinal recess therein; a movable frame member mounted to slide in the recess; and a marking guide on each of said members; at least one of said members having a detachable device thereon for aligning a workpiece to be marked, said device comprising a plate adapted to seat on the one member, a transverse lug on the plate adapted to seat in the recess against the one member, a longitudinal flange on the plate adapted to seat against the side of the base member, and an element hinged on said plate for movement toward and away from said plate to align a workpiece.

3. A mark-positioning device comprising a base having a longitudinal recess therein; a clamp on said base for holding one part of a workpiece to be marked; a movable frame mounted to slide in the recess; marking guides on said base and said frame; and detachable aligning means on said frame for engaging another part of the workpiece, said means comprising a plate adapted to seat on said frame, a transverse lug on the plate adapted to seat in the recess against the frame, a longitudinal flange on the plate adapted to slide along the side of the base member, a transverse jaw hinged on said plate for movement toward and away from said plate and adapted to align the workpiece against said plate, said jaw having a recess formed in the transverse inner edge of said jaw nearest the base marking guide, said recess serving to align the workpiece longitudinally relative to the device.

4. A mark-positioning device comprising a base member, a clamp on said base member for holding a workpiece, a longitudinally movable frame member on said base member, a friction brake on said movable frame member, each of said members having a transverse channel with a transverse edge of the channel in each member forming a marking guide for each member, a movable scale fastened at one end to said movable frame for indicating the distance between said edges, a housing for enclosing said scale except for a limited observation opening, and detachable means on said frame for engaging and aligning a workpiece.

FRANK F. WILLMS.

REFERENCES CITED

The following references are of record in the file of this patent:

UNITED STATES PATENTS

| Number | Name | Date |
|---|---|---|
| 1,140,330 | Merlin | May 18, 1915 |
| 1,346,224 | McCormick | July 13, 1920 |
| 1,359,462 | Pauk | Nov. 16, 1920 |
| 1,808,144 | Lungstrass | June 2, 1931 |

FOREIGN PATENTS

| Number | Country | Date |
|---|---|---|
| 137,905 | Great Britain | Jan. 29, 1920 |
| 426,847 | Germany | Mar. 19, 1926 |